Figure 1:
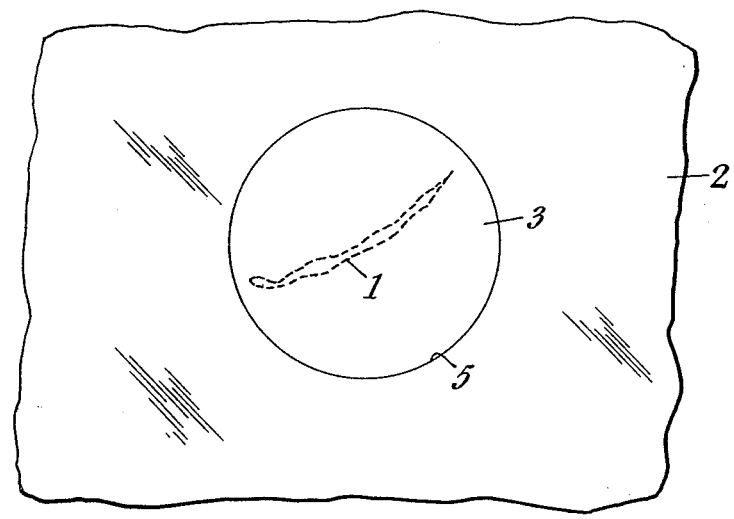

July 17, 1962  D. DEWAR  3,044,920
REPAIR OF THERMOPLASTIC MATERIALS
Filed Jan. 6, 1958  2 Sheets-Sheet 1

INVENTOR
Douglas Dewar
by Benj. T. Rauber
his attorney

July 17, 1962  D. DEWAR  3,044,920
REPAIR OF THERMOPLASTIC MATERIALS
Filed Jan. 6, 1958  2 Sheets-Sheet 2

INVENTOR
Douglas Dewar
by Benj. T. Rauber
his attorney

United States Patent Office 3,044,920
Patented July 17, 1962

3,044,920
REPAIR OF THERMOPLASTIC MATERIALS
Douglas Dewar, Wolston, near Coventry, England, assignor to Dunlop Rubber Company Limited, London, England, a British company
Filed Jan. 6, 1958, Ser. No. 707,313
Claims priority, application Great Britain Jan. 15, 1957
3 Claims. (Cl. 156—97)

This invention relates to the repair of thermoplastic materials and in particular relates to the repair of tubular or other closed structures by the high-frequency electrical "welding" of patching material thereto.

In the high-frequency "welding" of thermoplastic materials a high-frequency electric current is passed from one electrode to an opposed electrode through two or more intervening superimposed layers of thermoplastic material which are to be joined, the heat generated by the high-frequency current being sufficient to fuse the layers of thermoplastic material into a semi-liquid state which, on cooling, solidifies into a homogeneous mass in which the plurality of layers is substantially, or entirely, integrated.

A suitable apparatus for this purpose comprises a device having two extending superimposed arms to one of which, normally the lower one, a fixed electrode in the form of an "anvil" is secured and in the other of which a vertically reciprocable electrode is mounted. The parts to be welded are fed progressively in superimposition over the "anvil" and a pedal or the like is then depressed to bring the upper electrode down upon the superimposed layers and to close a switch whereby the heating current is applied to soften the material without completely melting it or causing it to flow. The movable electrode is normally automatically retractable under the control of spring means. One or both the electrodes may take the form of rotating discs, whereby the "welding" operation is continuous as the material is fed therebetween.

Such arrangements are normally satisfactory in the manufacture of new structures, even of substantially-closed bodies, e.g. tubes or hollow spherical bodies having valve or other like apertures therein, as the progress of the "welding" operation may be arranged to finish at such opening. When, however, such structures require to be repaired a serious difficulty occurs if the damage is in a position remote from the valve or like aperture, and the location of the damage may be such that, under existing conditions, a "welded" repair is impossible.

In this regard it should be pointed out that where a "welded" repair in a tubular or spherical thermoplastic object is necessary, this cannot be effected by placing the "anvil" at one outer portion of the object and the movable electrode over a patch on the opposite outer surface of the object as this would cause the opposite walls to be pinched together and, upon the application of high-frequency current, both these walls of the object would soften, together with the patch to be applied, and would subsequently solidify into a mass, whereby the two opposed walls would be "welded" together and the object would no longer be hollow at the location of the patch.

Even in the case of thermoplastic sheets the problem is similar if the sheet is of such a size that it cannot be gathered sufficiently into the space between the arms of the arms of the high-frequency "welding" machine to permit the damaged portion, only, to be brought between the electrodes.

The object of the present invention is to provide a patch for repairing thermoplastic materials whereby the above disadvantages are overcome.

A further object of the invention is to provide a method of repairing thermoplastic materials wherein the major portion of the repairing operation takes place substantially externally, from one side only, of the material, without it being necessary to have more than a very limited access to the other side thereof.

According to the invention a patch for use in the repair of thermoplastic materials comprises a pair of similarly-shaped superimposed members of like thermoplastic material secured together at their peripheral edges, one of said members being imperforate and the other of said members having a hole formed therethrough.

Preferably the external diameter of said imperforate member is slightly greater than the diameter of the member having the hole formed therethrough so that when said peripheral edges are joined together the imperforate member is drawn into an externally-convex configuration.

According also to the invention, a method of repairing a tear, puncture or the like in thermoplastic material comprises the steps of cutting said material around the damaged portion thereof to form an aperture of the shape and size of the patch to be applied thereto, applying to said aperture a patch as hereinabove defined, locating said patch with the member thereof having said hole therethrough lying adjacent said aperture, and with the periphery of said hole coinciding with the periphery of said aperture, and securing said peripheries together in superimposed relation.

Figure 2:
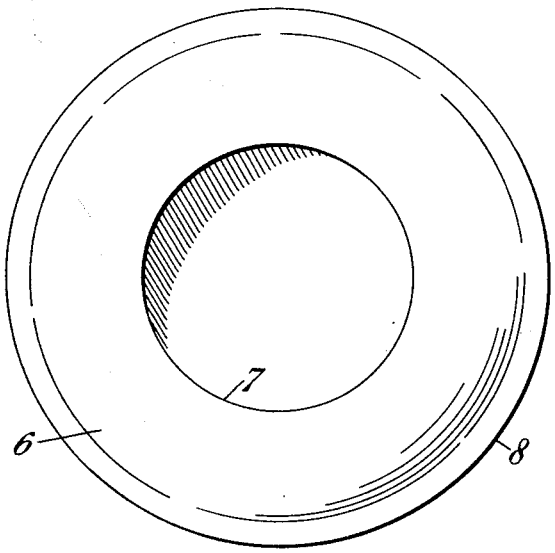
Figure 3:
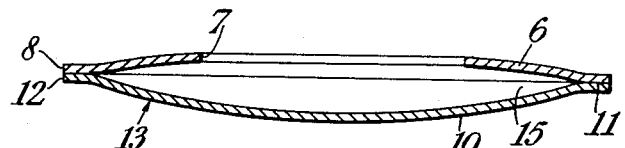
Figure 4:
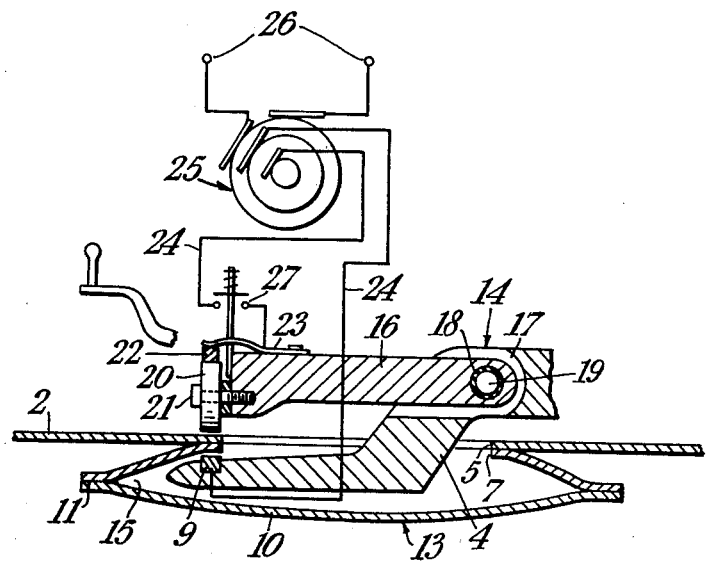

But a better understanding of the invention may be obtained from the following description when this is read with reference to the accompanying drawings, of which:

FIGURE 1 shows a portion of thermoplastic material with a tear therein shown in broken lines and a method of preparing the damaged portion for patching shown in full lines, FIGURE 2 is a top plan view and FIGURE 3 is a section of a patch according to the invention, and FIGURE 4 is a section of the patch of FIGURE 3, and the material of FIGURE 1, showing the patch in position thereon; a portion of the high-frequency "welding" apparatus being shown in section, and the electrical circuit therefor being shown symbolically.

In a practical application of the invention, shown in the drawings, a thermoplastic element, which may be either a portion of a hollow body or a flat sheet, having a tear 1 in a portion 2 thereof, has the torn portion 1 removed by cutting out a circular portion 3 of such size that the torn portion 1, and any weakened zone of material adjacent thereto, is eliminated. Whilst there is substantially no upper limit to the size of the removed portion 3, the minimum size thereof should be sufficient to permit the lower arm 4 (FIGURE 4) of a high-frequency electric thermal-"welding" machine of known type to pass freely into the hole 5 so formed. Thus, regardless of the size of the damaged portion 3, the hole 5 to be cut may, for example, be of the order of 2" in diameter but may be as much larger as is necessary. An annulus 6 of material of the same type as that forming the material to be repaired has its central aperture 7 cut to the same size as the hole 5 cut in the wall 2 of the hollow body, and its outer periphery 8 cut to such a size that the annular band 6 of material between its inner and outer peripheries is somewhat wider than the distance between the free end of the lower electrode-carrying arm 4 of the high-frequency electric "welding" machine and the electrode 9 on that arm 4, for a reason later to be apparent. A disc 10 of the same material as the annulus 6 is cut to a diameter slightly exceeding the outer diameter 8 of the annulus, and the external peripheries of the annulus 6 and the disc 10 are then "welded" together as at 11, by high-frequency electric current, with their peripheral edges 8 and 12 in superimposed alignment. Due to the slightly greater diameter of the disc 10, the resultant structure is a pocket-like dish having a substantially-flat annular top and a saucer-like base. This device constitutes the patch 13 to be applied to the hole 5 previously cut in the material.

The patch 13 is passed through the hole 5 in the material with its annular portion 6 adjacent the inner face of the material and the inner periphery 7 of the annular portion 6 of the patch 13 is brought into coincidence with the peripheral edge of the hole 5, and is tacked in this position, either by a suitable adhesive or by spot "welding," in the known manner.

The lower arm 4 of a high-frequency electric thermal "welding" device 14 is then passed downwards into the hole 5 and into the re-entrant annular pocket 15 formed by the junction of the annulus 6 and disc 10 of the patch 13 so that the lower electrode, or "anvil" 9 lies beneath the superimposed peripheral edges 5, 7 of the annulus 6 of the patch 13 and the material 2 around the hole 5 in the material.

The high-frequency apparatus 14 may be of any suitable known type in which the lower arm 4 is sufficiently slender to pass into the pocket 15 to bring the lower electrode 9 beneath the superimposed portions of the patch 13 without puckering or straining the material.

In the simple form of such apparatus as shown in FIGURE 4, the lower electrode, or "anvil" 9 is secured in the upper surface of the lower arm 4 adjacent its free end. The upper arm 16 is pivoted for vertical movement in a slot 17 cut in the lower arm 4, the arms 4 and 16 being electrically insulated by a dielectric bush 18 between the arm 16 and its pivot 19. The arm 16 may be normally spring-urged in an upward direction by suitable resilient means, and suitable means are provided to move the free end of the arm 16 downwards towards the arm 4, as required, for a purpose to be described.

Immediately above the anvil 9, and in the free end of the upper arm 16, a disc 20 of suitable conductive material is rotatably mounted on a spindle 21 secured in the end of the arm 16 so that the disc 20 is disposed to rotate co-axially of the longitudinal axis of the arm 16 immediately above the anvil 9. A carbon, or like, brush 22 is urged into contact with the periphery of the disc 20 by a spring 23 secured in the arm 16. The anvil 9 and brush 22 are connected by a suitable electric circuit 24 with the high-frequency end of an electrical frequency changer 25, which is shown symbolically in FIGURE 4. The low-frequency end of the frequency changer 25 is connected to a source of potential at the terminals 26.

It is to be understood that neither the particular source of the high-frequency current nor the high-frequency apparatus per se form any part of the present invention. Accordingly although the frequency changer 25 is symbolically illustrated as being a rotary mechanical device, such device may alternatively be one of the electronic high-frequency generators known in the art to be suitable for use in high-frequency thermoplastic "welding" or seaming apparatus.

Similarly, although specific forms of "welding" arms and electrodes have been shown in FIGURE 4 of the drawings, these are shown for illustrative purposes, only, and per se, form no part of the invention. In practising the present invention it will be preferred to use a rotary electrode 20 in all cases where the repair is to be effected to a hollow inflatable article or to one which requires to be made fully air- and/or water-tight as, for instance, in the case of an inflatable raft or dinghy or an inflatable suit. Where, however, the repair is to be effected to a thermoplastic sheet, such as a waterproof ground sheet, a tent wall or a waterproof cape or the like, the repair may be effected by the process known in the art as "stitching." In the latter case the electrode 20 would be non-rotatable similarly to the anvil 9, and the actual "welding," or "stitching," would be effected by reciprocation of the upper arm 16 as the material was moved between it and the anvil 9.

If desired, the anvil 9 may also take the form of a rotatable disc, similar to the electrode 20, and may be provided with a slightly-roughened peripheral surface and means may be provided to cause its rotation, so that when the material 2 and patch 13 are nipped between the electrode and anvil rotation of the anvil 9 will cause the material and patch automatically to be fed therebetween.

A switch 27 may be inserted in the circuit 24 so that the high-frequency current is flowing through the circuit only when the electrode 20 and anvil 9 are in their operative relationship.

In carrying out the invention, therefore, when the lower arm 4 of the device 14 is inserted into the pocket 15 of the patch 13 and the patch 13 and material 2 are in their desired relationship, the upper arm 16 is lowered to grip the edges 5 and 7 between the electrode 20 and the anvil 9, this movement closing the switch 27 and energising the high-frequency circuit 24.

High-frequency electric current is then passed through the electrode 20 and the intervening material to the anvil 9, the heat therefrom sufficiently plasticising the superimposed layers 5, 7 to cause them, on cooling, to become a homogeneous "welded" joint around the periphery 5 of the hole. During this operation the material 2 is turned so that the electrode 20 and anvil 9 circumscribe the hole 5 in the body, the bulk of the material, if a hollow body, freely passing beneath the lower arm 4 of the device and not being required to be passed through the limited space between the upper and lower arms 16, 4 thereof. Alternatively, a portable high-frequency apparatus may itself be moved around the hole 5 and the material be allowed to remain stationary. This latter form of apparatus will be preferable where the object to be repaired is of any substantial bulk.

It will be apparent from the foregoing description that a method of repairing sheets or hollow bodies of thermoplastic material has been devised which is applicable to substantially any size of sheet or hollow body without necessity for the structural adaptation of existing high-frequency electric "welding" apparatus, the "welding" operation being wholly carried out from the exterior of the hollow body or from the one side of the sheet, and consequent awkward manipulation of the body or sheet in the confined space between the arms of the "welding" apparatus being avoided.

Although it is preferred to make the disc 10 of the patch of slightly greater diameter than the annulus 6, that is not essential and both parts of the patch 13 may have precisely the same diameter. However, the dished shape of the disc 10 produces a slightly larger annular pocket between the disc 10 and the annulus 6 and thus permits the free end of the lower electrode arm 4 to be inserted without straining the patch material or the peripheral patch joint. The size of this pocket may be varied to suit different "welding" arms by variations in the diametrical difference in size between the disc 10 and the annulus 6 prior to making-up the patch.

In the practical application of the invention a stock of patches 13 may be pre-formed in various shapes and sizes, and the hole 5 in the sheet or hollow body 2 will then be cut to a shape and size suited both to the damaged portion 1 thereof and to the standard patches available.

Whilst the invention has been described specifically in relation to a circular patch, this is not essential to the invention, as rectangular, oval or other-shaped patches may be used on holes of a corresponding shape. The circular patch described is, however, likely to be the most convenient shape.

Similarly, although the patch is particularly adapted to high-frequency electric "welding" of thermoplastic materials, it is not exclusive to this manner of securing, and suitable adhesives may alternatively be used.

In the case of a pressurised hollow body, the present type of patch offers distinct advantages over the external patch in that, when pressurised, the annular extension of the patch around the periphery of the hole acts similarly to a valve to augment the initial seal at the joint with the body and relieve the joint of some degree of pressure and strain.

The present invention is applicable to substantially any type of thermoplastic material capable of being rendered plastic or semi-plastic by the heat developed by high-frequency electricity. Certain safeguards are necessary in carrying the invention into practice to ensure that the appropriate degree of heat is applied to the material for the appropriate period necessary to render the material fusibly plastic and yet to avoid causing the material to melt and run. Accordingly, it is essential that the device should be adjusted to the particular material to be treated prior to the commencement of the "welding" operation, and such adjustment may be either an adjustment in the current frequency, an adjustment in the rate of rotation of the rotatable electrode 20, or electrode 20 and anvil 9, or a variation in the period of energisation of the circuit 24. The latter adjustment may be effected by the incorporation of a suitable time device in the switch 27.

It is of particular importance, to ensure a truly homogeneous bond, that the patch used for any repair should have similar physical characteristics, particularly in regard to its critical flow, or melting, temperature, as the material to which it is applied. Where applicable, this latter limitation should be regarded as existing in the following claims.

Having now described my invention, what I claim is:

1. A method of repairing a tear, puncture, or the like in thermoplastic material, comprising the steps of cutting said material around the damaged portion thereof to form an aperture, applying to said material about said aperture an annular margin of a patch of thermoplastic material having an imperforate sheet sealed to the outer periphery of said annular margin with the inner tperiphery of said annular margin lying adjacent the periphery of said aperture, heating said annular margin and the area of said plastic material in contact therewith to the softening temperature and pressing them together.

2. A method according to claim 1 comprising the steps of inserting an electrode-carrying arm of an electric high-frequency apparatus through said aperture and the opening within the annular margin of said patch when said peripheries are in superimposed relation, locating the electrode on said arm below said superimposed peripheries, locating a second electrode on said apparatus above said superimposed peripheries, clamping said peripheries therebetween, and passing a high-frequency electric current between said electrodes and through said superimposed peripheries.

3. The method of claim 1 in which said annular margin of said patch and the area of said material in contact therewith are heated by high frequency electric currents.

References Cited in the file of this patent

UNITED STATES PATENTS

| 622,436 | Bancroft | Apr. 4, 1899 |
| 637,136 | Lemmermann | Nov. 14, 1899 |
| 2,076,079 | Gammeter | Apr. 6, 1937 |
| 2,348,287 | Fiekers | May 9, 1944 |
| 2,430,076 | Pollock | Nov. 4, 1947 |
| 2,517,672 | Jenkins | Aug. 8, 1950 |
| 2,520,802 | Hampton | Aug. 29, 1950 |

FOREIGN PATENTS

| 629,474 | Great Britain | Sept. 21, 1949 |